Jan. 28, 1941.  G. GRUBB  2,229,697
REFRIGERATION
Filed March 23, 1938

INVENTOR.
Gunnar Grubb
BY
his ATTORNEY.

Patented Jan. 28, 1941

2,229,697

UNITED STATES PATENT OFFICE 2,229,697

REFRIGERATION

Gunnar Grubb, Stockholm, Sweden, assignor, by mesne assignments, to Servel, Inc., New York, N. Y., a corporation of Delaware Application March 23, 1938, Serial No. 197,573
In Germany April 3, 1937

8 Claims. (Cl. 62—119.5)

This invention relates to refrigeration, and more particularly to refrigeration systems of the absorption type.

It is an object of the invention to provide an improvement for cooling an absorber in refrigeration systems of this type, so that gas will be more effectively absorbed into liquid and the efficiency of the refrigeration system thereby increased.

Figure 1:
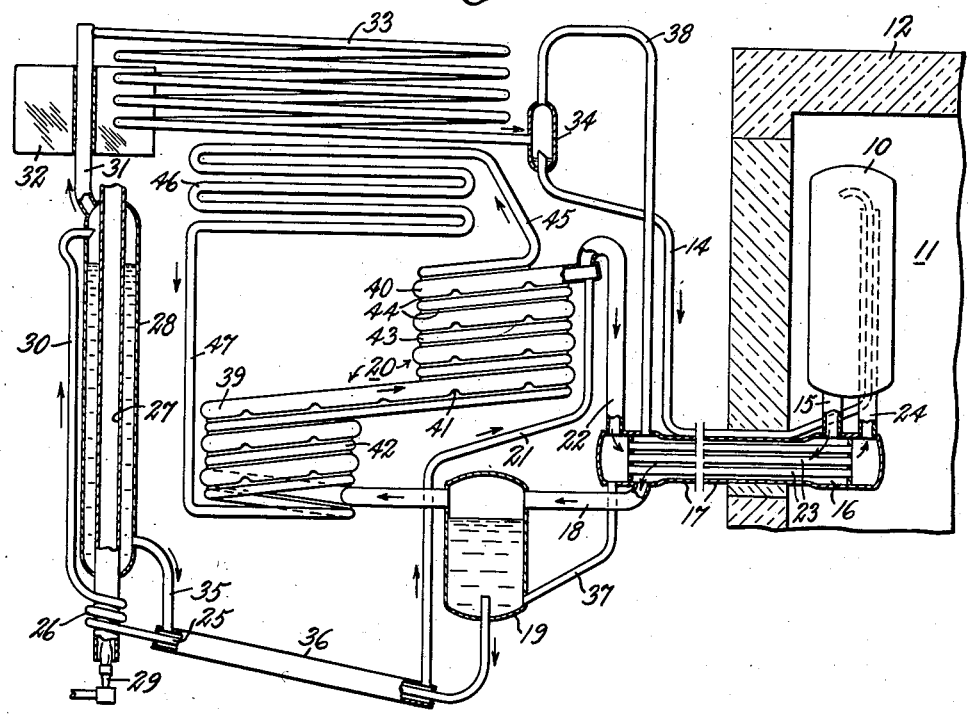
Figure 2:
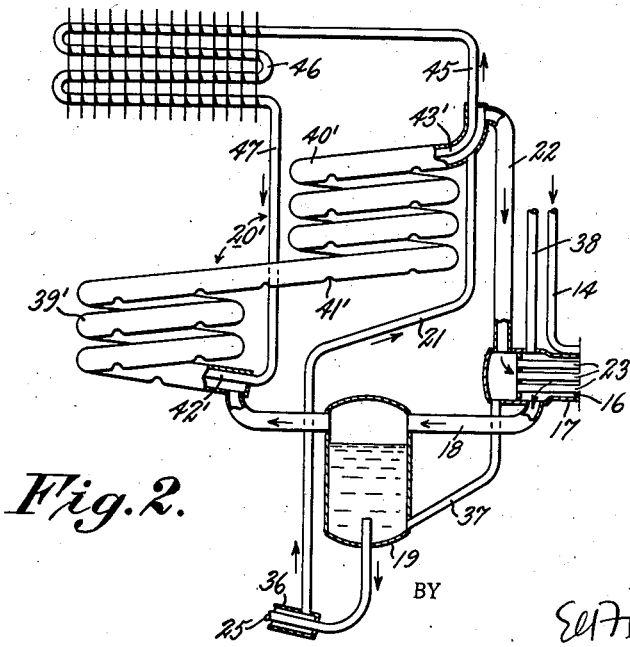

The above and other objects and advantages of the invention will be more fully understood upon reference to the following description and the accompanying drawing forming a part of this specification, and of which Fig. 1 illustrates more or less diagrammatically an absorption refrigeration system embodying the invention, and Fig. 2 is a fragmentary view of the system shown in Fig. 1 illustrating a modification of the invention.

Referring to Fig. 1, the invention is embodied in an absorption refrigeration system of a uniform pressure type, generally as described in Patent No. 1,837,767 to Thore M. Elfving, in which an auxiliary pressure equalizing gas is employed. The system includes a cooling element or evaporator 10 disposed in an enclosed space 11 which may form part of a food storage compartment of a thermally insulated cabinet 12. Liquid refrigerant, such as ammonia, is introduced through a conduit 14 into cooling element 10 and evaporates and diffuses therein into an inert gas, such as hydrogen, to produce a refrigerating effect.

The resulting rich gas mixture of refrigerant and inert gas flows from cooling element 10 through conduit 15, outer passage 16 of a gas heat exchanger 17, and conduit 18 into an accumulation vessel 19. The gas rich in refrigerant flows from vessel 19 into the lower end of an absorber 20 in which refrigerant is absorbed into absorption liquid that enters the upper part of the absorber through a vertically extending conduit 21.

The inert gas, which is practically insoluble and weak in refrigerant, passes from the upper end of the absorber through conduit 22, a plurality of tubes 23 forming the inner passage of gas heat exchanger 17, and conduit 24 into the upper part of cooling element 10. The absorption liquid flowing downward through absorber 20 in counter-flow to the gas mixture becomes enriched in refrigerant and flows into accumulation vessel 19. From vessel 19 enriched absorption liquid is conducted through a conduit 25 to a coil 26 which is disposed about the lower end of a flue 27 extending through a generator 28.

By heating generator 28, as by a gas burner 29, for example, refrigerant vapor and absorption liquid are raised by vapor-lift action from coil 26 through conduit 30 into the upper part of generator 28. Liberated refrigerant vapor entering generator 28 through conduit 30, and also refrigerant vapor expelled from solution in the generator, flows upward in conduit 31 through an air-cooled rectifier 32. From rectifier 32 refrigerant vapor flows into an air-cooled condenser 33 which is in the form of a large coil and over the surfaces of which the surrounding cool air flows. Refrigerant vapor is liquefied in condenser 33 and flows through a gas separating chamber 34 and conduit 14 to cooling element 10 to complete the refrigerating cycle.

Absorption liquid weak in refrigerant flows from the lower part of generator 28 through conduits 35, 36, and 21 into the upper part of absorber 20. The conduit 36 is disposed about conduit 25 to form a liquid heat exchanger whereby heat is transferred from weak absorption liquid flowing to absorber 20 to enriched absorption liquid flowing to generator 28.

A portion of conduit 14 is arranged in thermal exchange relation with passage 16 of gas heat exchanger 17 and through which enriched cold gas flows from cooling element 10 to absorber 20. A conduit 37 is connected to gas heat exchanger 17 and the lower part of vessel 19, whereby any liquid accumulating in the heat exchanger may be drained therefrom to vessel 19.

A vent conduit 38 is connected to chamber 34 and to the gas circuit, as at gas heat exchanger 17, for example. The vent conduit 38 extends upward from chamber 34 and then downward to the gas heat exchanger, so that any gas which passes through condenser 33 can flow into the gas circuit and not be trapped in the condenser.

During normal operation of the system, gas circulates continuously in the gas circuit including cooling element 10 and absorber 20. This circulation of gas is due to the difference in specific weight of the column of gas rich in refrigerant vapor and flowing toward absorber 20, and the column of gas weak in refrigerant vapor and flowing toward cooling element 10. Due to the difference in specific weight of the columns of rich and weak gas, a force is developed in the gas circuit for causing flow of gas therein. The more effectively refrigerant vapor is absorbed into absorption liquid in absorber 20, the greater will be the difference in specific weight of the columns of rich and weak gas flowing toward absorber 20 and toward cooling element 10, respectively.

In accordance with the invention, structure is provided for effectively cooling absorber 20, whereby the latter will operate efficiently to absorb refrigerant gas into absorption liquid. The absorber 20 comprises a conduit which is formed to provide a lower coil 39 and an upper coil 40. The lower portions of coils 39 and 40 are indented at spaced intervals at 41 to provide small dams whereby shallow pools of liquid may form in the coils. The coils 39 and 40 are offset with respect to each other with the lower end of coil 39 connected to vessel 19 and the upper end of coil 40 connected to conduits 21 and 22.

The coils 39 and 40 are arranged in heat exchange relation with a conduit adapted to contain a cooling fluid. This conduit is also formed to provide a lower coil 42 and an upper coil 43. The lower coils 39 and 42 and upper coils 40 and 43 are arranged to form annular or cylindrical structures. In lower coils 39 and 42, for example, the individual turns of coil 39 are disposed between adjacent turns of coil 42 and in the same vertical plane to form the wall of the lower cylindrical structure. Similarly, the individual turns of coil 40 are disposed between adjacent turns of coil 43 and in the same vertical plane to form the wall of the upper cylindrical structure.

The coils 39 and 42 and also the coils 40 and 43 may be arranged so that the walls thereof are in abutting relation and contact each other as much as possible. Any spaces between the coils may be filled with metal. When the walls of the coils are not arranged in abutting relation the coils may be dipped in molten metal, such as tin, for example, to fill all the spaces with metal, as indicated at 44. In this manner a metallic heat conductive path is provided between the walls of the coils along their entire length.

The coils 42 and 43 are preferably arranged to form part of a closed fluid circuit. Such circuit may include a conduit 45 which is connected to the upper end of coil 43 and also to the upper end of a looped coil 46. The lower end of looped coil 46 is connected by a conduit 47 to the lower end of coil 42.

The coils 42 and 43, looped coil 46, and connecting conduits 45 and 47 form a hermetically sealed circuit which may be partly filled with a suitable volatile liquid. When the refrigeration system is operating and heat is liberated in coils 39 and 40 due to absorption of refrigerant gas, liquid in coils 42 and 43 is heated and evaporated. The coils 42 and 43 constitute an evaporation member and the vapor formed therein flows upwardly through conduit 45 into looped coil 46. The looped coil 46 constitutes a condenser member and vapor is condensed therein due to the cooling influence of surrounding air which passes over the surfaces of the coil. The condensate formed in looped coil 46 flows downward through conduit 47 and back to coils 42 and 43 where it is again evaporated. The volatile fluid serves as a heat transfer agent and circulates naturally in the manner just described. The evaporation of liquid in coils 42 and 43 takes up heat from coils 39 and 40, and the condensation of vapors in looped coil 46 gives up heat to surrounding cool air which flows over the surfaces thereof.

By providing structure of the character just described for cooling absorber 20, all parts of the absorber which are wetted by liquid are in the same heat conductive relation with cooling fluid, due to the metallic heat conductive path between the walls of the coils. All parts of the absorber are therefore effectively cooled and maintained at substantially the same temperature which is determined by the temperature of the cooling air passing over the surfaces of condenser member 46. With heat effectively transmitted from coils 39 and 40 along their entire length, absorber 20 will operate efficiently to absorb refrigerant gas into absorption liquid.

If desired, coils 39 and 42 and also coils 40 and 43 may be cast in metal and provided with vertically extending cooling fins to provide additional heat radiating surfaces. In such case, additional air cooling is effected due to the upward flow of air which is induced by natural draft. By providing the absorber with lower and upper offset portions, air passing over the surfaces of the lower portion and heated thereby does not pass directly over the surfaces of the upper portion.

Instead of forming condenser member 46 in the shape of a looped coil having straight portions and connecting bends, the condenser member may be formed in the shape of a larger helical coil, such as condenser 33, for example; or the cooling surfaces of the looped coil may be increased by providing the coil with cooling fins.

While the absorber 20 has been shown as having lower and upper offset coil portions, the total height of the absorber may be shortened considerably by eliminating the upper coil portion and employing a coil having the height of the lower coil portion but similar to condenser 33 to provide sufficient conduit length. With the height of the absorber shortened, the height to which liquid must be raised in conduit 21 is shortened, whereby the height of the refrigeration system may be reduced so that it will occupy less space.

The fragmentary view in Fig. 2 diagrammatically illustrates a modification of the invention shown in Fig. 1. The parts of the refrigeration system in Fig. 2 which are similar to the parts in Fig. 1 are designated by the same reference numerals. In this modification the offset coils 39' and 40' with indentations 41' are similar to coils 39 and 40 in Fig. 1. In Fig. 2, however, the coils 42' and 43', which correspond to coils 42 and 43 in Fig. 1, are arranged within coils 39' and 40'. The inner coils 42' and 43' may be secured to the ceiling of the outer coils 39' and 40'. The conduits from which the coils are formed are preferably secured together, as by welding, for example, before they are formed into coils.

As in the embodiment first described, the closed fluid circuit in Fig. 2 is partly filled with a suitable volatile liquid. The evaporation of liquid in coils 42' and 43' takes up heat resulting from absorption of refrigerant gas in coils 39' and 40', and the condensation of vapors in looped coil 46 gives up heat to the surrounding air which passes over the surfaces of the coil.

In coils 39' and 40' the refrigerant gas diffuses out of the inert gas, and the distance the refrigerant gas must move to the surface of the liquid is the diffusion distance. By arranging coils 42' and 43' within coils 39' and 40', the inner coils will occupy space that would otherwise be occupied by gas. When the inner coils are located at the upper parts of the outer coils and at the regions where the diffusion distance is the greatest, the inner coils are effective to reduce the mean diffusion distance of the refrigerant gas. By decreasing the mean diffusion distance in this manner, the absorption of refrigerant gas is improved considerably.

The inner coils 42′ and 43′ are preferably of such size that sufficient space is provided to insure circulation of gas at the desired rate in the gas circuit. With gas circulating at the desired rate, the capacity of the refrigerating system will not be impaired.

With liquid in the outer coils 39′ and 40′ wetting the lower surface portions of inner coils 42′ and 43′, heat transfer from liquid to cooling fluid in the inner coils is readily effected. If desired, members may be provided to direct liquid onto the convex surfaces of the inner coils. The liquid directed onto the inner coils in this manner tend to adhere and flow along such surfaces, thereby increasing the effective surface contact between the liquid and gas. The outer surfaces of the inner coils 41′ and 42′ may be roughened or covered with fine gauze.

While several embodiments of the invention have been shown and described, such variations and modifications are contemplated as fall within the true spirit and scope of the invention, as pointed out in the following claims.

What is claimed is:

1. Refrigeration apparatus having a gas circuit including a first conduit having an inlet and outlet at different elevations, means for introducing liquid in said first conduit in the presence of said gas, a second conduit providing a path of flow for cooling fluid and in thermal conductive relation with said first conduit so that a metallic heat conductive path is provided between the walls thereof along their length, both of said conduits being formed to provide off-set coil portions with the turns of one conduit in each of said coil portions being substantially in alignment with the turns of the other conduit in the same coil portion, and said offset coil portions of said first conduit providing a path of flow for liquid from said inlet to said outlet first through one portion and then through the other portion.

2. Refrigeration apparatus as set forth in claim 1 in which said second conduit forms part of a closed fluid system in which the cooling fluid circulates to transfer heat from said first conduit to a medium in thermal exchange relation with a portion of the closed fluid system.

3. Refrigeration apparatus as set forth in claim 1 in which said second conduit forms part of a closed fluid system containing a volatile fluid which undergoes vaporization and condensation and transfers heat from said first conduit to a medium in thermal exchange relation with a portion of the closed fluid system.

4. Refrigeration apparatus as set forth in claim 1 in which one of said conduits extends longitudinally within the other of said conduits.

5. Refrigeration apparatus having a gas circuit including a first conduit having an inlet and outlet at different elevations, means for introducing liquid in said conduit in the presence of the gas, and a second conduit providing a path of flow for cooling fluid, said second conduit being disposed longitudinally within said first conduit and located at the upper part of the latter.

6. Refrigeration apparatus as set forth in claim 5 in which said second conduit forms part of a closed fluid system partly filled with a volatile liquid which undergoes vaporization and condensation and transfers heat from said first conduit to a medium in thermal exchange relation with a portion of the closed fluid system.

7. Refrigeration apparatus having a gas circuit including a first conduit having an inlet and outlet at different elevations, means for introducing liquid in said conduit in the presence of the gas, and a second conduit providing a path of flow for cooling fluid and disposed longitudinally within said first conduit, and said conduits being arranged so that a metallic heat conductive path is provided between the walls thereof at the ceiling of said first conduit.

8. Refrigeration apparatus having a gas circuit including a first conduit having an inlet and outlet at different elevations, means for introducing liquid in said conduit in the presence of said gas, a second conduit providing a path of flow for cooling fluid and arranged alongside said first conduit so that a metallic heat conductive path is provided between the walls thereof along their length, and both of said conduits being formed to provide off-set coil portions with the turns of one conduit in each of said coil portions being disposed between the adjacent turns of the other conduit in the same coil portion.

GUNNAR GRUBB.